(12) United States Patent
Echigo

(10) Patent No.: US 12,104,549 B2
(45) Date of Patent: Oct. 1, 2024

(54) METHOD FOR CONTROLLING INTERNAL COMBUSTION ENGINE AND DEVICE FOR CONTROLLING INTERNAL COMBUSTION ENGINE

(71) Applicant: NISSAN MOTOR CO., LTD., Yokohama (JP)

(72) Inventor: Ryo Echigo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 320 days.

(21) Appl. No.: 17/631,981

(22) PCT Filed: Aug. 2, 2019

(86) PCT No.: PCT/IB2019/001264
§ 371 (c)(1),
(2) Date: Feb. 1, 2022

(87) PCT Pub. No.: WO2021/024011
PCT Pub. Date: Feb. 11, 2021

(65) Prior Publication Data
US 2022/0282682 A1    Sep. 8, 2022

(51) Int. Cl.
*F02D 41/14* (2006.01)
*B60W 10/06* (2006.01)
(Continued)

(52) U.S. Cl.
CPC .......... *F02D 41/146* (2013.01); *B60W 10/06* (2013.01); *B60W 10/08* (2013.01); *B60W 20/16* (2016.01);
(Continued)

(58) Field of Classification Search
CPC .. F02D 41/146; F02D 41/042; F02D 2200/08; F02D 2200/501; F02D 41/062;
(Continued)

(56) References Cited

U.S. PATENT DOCUMENTS 6,792,750 B2 * 9/2004 Nagai ................. F02D 41/0295
60/285
11,203,995 B2 * 12/2021 Von Wissel ......... F02D 41/0245
(Continued)

FOREIGN PATENT DOCUMENTS

JP    2006307649 A  * 11/2006
JP    2009-35117 A    2/2009
(Continued)

*Primary Examiner* — Carl C Staubach
(74) *Attorney, Agent, or Firm* — Foley & Lardner LLP

(57) ABSTRACT

A vehicle (1) is a hybrid vehicle including a traveling mode to travel only with the driving force of a drive motor (5). Vehicle (1) is mounted with an internal combustion engine (10) capable of being operated at an air-fuel ratio leaner than the theoretical air-fuel ratio. The operation of internal combustion engine (10) is controlled by a control unit (41). Control unit (41) is configured to determine whether to stop internal combustion engine (10) in an operation state, in consideration of the NOx adsorption ratio of a downstream-side exhaust purification catalyst (33) provided in an exhaust passage (31) of internal combustion engine (10).

10 Claims, 6 Drawing Sheets

(51) Int. Cl.
    *B60W 10/08*     (2006.01)
    *B60W 20/16*     (2016.01)
    *F02D 41/04*     (2006.01)

(52) U.S. Cl.
    CPC ..... *F02D 41/042* (2013.01); *B60W 2510/244* (2013.01); *B60W 2520/00* (2013.01); *F02D 2200/08* (2013.01); *F02D 2200/501* (2013.01)

(58) Field of Classification Search
    CPC ......... F02D 2200/0806; F02D 41/0275; F02D 29/02; B60W 10/06; B60W 10/08; B60W 20/16; B60W 2510/244; B60W 2520/00; F02N 2200/02; F02N 2200/023; F02N 2200/061; F02N 2200/0801; F02N 11/0829; B60L 50/16; F01N 3/20
    USPC ......................................... 701/22; 123/198 F
    See application file for complete search history.

(56) References Cited

U.S. PATENT DOCUMENTS

| | | | |
|---|---|---|---|
| 11,708,806 B2 * | 7/2023 | Kimura | B60K 6/46 123/520 |
| 2002/0052266 A1 * | 5/2002 | Suzuki | B60K 6/445 477/102 |
| 2005/0193722 A1 * | 9/2005 | Fujiwara | F01N 13/009 60/285 |
| 2007/0205029 A1 * | 9/2007 | Leone | B60K 6/365 903/906 |
| 2008/0277176 A1 * | 11/2008 | Akimoto | B60W 10/06 290/40 C |
| 2010/0268438 A1 * | 10/2010 | Hiranuma | B60W 20/00 60/303 |
| 2013/0226439 A1 * | 8/2013 | Hashemi | F02D 41/0295 701/112 |
| 2014/0039781 A1 * | 2/2014 | Theis | F01N 13/011 701/112 |
| 2015/0298687 A1 * | 10/2015 | Kanno | F02D 41/0245 903/905 |
| 2018/0281774 A1 * | 10/2018 | Fukuda | B60W 10/06 |
| 2019/0226373 A1 * | 7/2019 | Fukuda | B01D 53/9422 |
| 2020/0040796 A1 * | 2/2020 | Yoo | F02D 41/402 |

FOREIGN PATENT DOCUMENTS

| | | |
|---|---|---|
| JP | 2017-25860 A | 2/2017 |
| JP | 2017025860 A * | 2/2017 |
| JP | 6207554 B2 | 10/2017 |

\* cited by examiner

FIG. 5

LNT ADSORPTION RATIO: 0%

| POWER THRESHOLD [kW] | | Vehicle Speed [km/h] | | | | | | | |
|---|---|---|---|---|---|---|---|---|---|
| | | 10 | 20 | 30 | 40 | 50 | 60 | 70 | 80 |
| SOC [/1] | 30.0% | --- | --- | --- | --- | --- | --- | --- | --- |
| | 55.0% | --- | --- | --- | --- | --- | --- | --- | --- |
| | 60.0% | --- | --- | --- | --- | --- | --- | --- | --- |
| | 65.0% | --- | --- | --- | --- | --- | --- | --- | --- |
| | 70.0% | 10.0 | --- | --- | --- | --- | --- | --- | --- |
| | 75.0% | 10.0 | 10.0 | 10.0 | 10.0 | --- | --- | --- | --- |
| | 80.0% | 15.0 | 15.0 | 15.0 | 15.0 | 10.0 | 10.0 | 10.0 | 10.0 |
| | 85.0% | 15.0 | 15.0 | 15.0 | 15.0 | 10.0 | 10.0 | 10.0 | 10.0 |

LNT ADSORPTION RATIO: 70%

| POWER THRESHOLD [kW] | | Vehicle Speed [km/h] | | | | | | | |
|---|---|---|---|---|---|---|---|---|---|
| | | 10 | 20 | 30 | 40 | 50 | 60 | 70 | 80 |
| SOC [/1] | 30.0% | --- | --- | --- | --- | --- | --- | --- | --- |
| | 55.0% | --- | --- | --- | --- | --- | --- | --- | --- |
| | 60.0% | --- | --- | --- | --- | --- | --- | --- | --- |
| | 65.0% | --- | --- | --- | --- | --- | --- | --- | --- |
| | 70.0% | 10.0 | --- | --- | --- | --- | --- | --- | --- |
| | 75.0% | 10.0 | 10.0 | 10.0 | 10.0 | --- | --- | --- | --- |
| | 80.0% | 15.0 | 15.0 | 15.0 | 15.0 | 10.0 | 10.0 | 10.0 | 10.0 |
| | 85.0% | 15.0 | 15.0 | 15.0 | 15.0 | 10.0 | 10.0 | 10.0 | 10.0 |

LNT ADSORPTION RATIO: 80%

| POWER THRESHOLD [kW] | | Vehicle Speed [km/h] | | | | | | | |
|---|---|---|---|---|---|---|---|---|---|
| | | 10 | 20 | 30 | 40 | 50 | 60 | 70 | 80 |
| SOC [/1] | 30.0% | --- | --- | --- | --- | --- | --- | --- | --- |
| | 55.0% | --- | --- | --- | --- | --- | --- | --- | --- |
| | 60.0% | --- | --- | --- | --- | --- | --- | --- | --- |
| | 65.0% | --- | --- | --- | --- | --- | --- | --- | --- |
| | 70.0% | 10.0 | --- | --- | --- | --- | --- | --- | --- |
| | 75.0% | 10.0 | 10.0 | 10.0 | 10.0 | --- | --- | --- | --- |
| | 80.0% | 20.0 | 15.0 | 15.0 | 15.0 | 10.0 | 10.0 | 10.0 | 10.0 |
| | 85.0% | 20.0 | 20.0 | 15.0 | 15.0 | 10.0 | 10.0 | 10.0 | 10.0 |

LNT ADSORPTION RATIO: 90%

| POWER THRESHOLD [kW] | | Vehicle Speed [km/h] | | | | | | | |
|---|---|---|---|---|---|---|---|---|---|
| | | 10 | 20 | 30 | 40 | 50 | 60 | 70 | 80 |
| SOC [/1] | 30.0% | --- | --- | --- | --- | --- | --- | --- | --- |
| | 55.0% | --- | --- | --- | --- | --- | --- | --- | --- |
| | 60.0% | --- | --- | --- | --- | --- | --- | --- | --- |
| | 65.0% | --- | --- | --- | --- | --- | --- | --- | --- |
| | 70.0% | 10.0 | --- | --- | --- | --- | --- | --- | --- |
| | 75.0% | 20.0 | 10.0 | 10.0 | 10.0 | --- | --- | --- | --- |
| | 80.0% | 25.0 | 20.0 | 15.0 | 15.0 | 10.0 | 10.0 | 10.0 | 10.0 |
| | 85.0% | 25.0 | 25.0 | 15.0 | 15.0 | 10.0 | 10.0 | 10.0 | 10.0 |

METHOD FOR CONTROLLING INTERNAL COMBUSTION ENGINE AND DEVICE FOR CONTROLLING INTERNAL COMBUSTION ENGINE

TECHNICAL FIELD

The present invention relates to a method for controlling an internal combustion engine and a device for controlling the internal combustion mounted on a hybrid vehicle.

BACKGROUND TECHNOLOGY

There has been known a hybrid vehicle which is capable of traveling by generating driving force for the vehicle by the output from at least one of an internal combustion engine and a motor generator.

For example, a hybrid vehicle in a patent document 1 includes a NOx trap catalyst which absorbs NOx in exhaust gas when an exhaust air-fuel ratio is lean, and carries out the desorption-reduction purification of the absorbed NOx is carried out when the exhaust air-fuel ratio is rich.

In this hybrid vehicle of the patent document 1, the operation and the stop of an internal combustion engine is controlled based on operation necessary determination based on vehicle drive force and the remaining charge amount of a battery.

In addition, in the hybrid vehicle of the patent document 1, when the amount of NOx absorbed by the NOx trap catalyst exceeds a predetermined adsorption limit amount during the operation of the internal combustion engine, the exhaust air-fuel ratio is made rich to form a reducing atmosphere, thereby carrying out the desorption-reduction purification of the absorbed NOx.

PRIOR ART DOCUMENT

Patent Document

Patent Document 1: Japanese Patent Application Publication 2009-35117

SUMMARY OF THE INVENTION

However, in the hybrid vehicle of the patent document 1, if the internal combustion engine is stopped based on the operation necessary determination when the amount of the absorbed NOx of the NOx trap catalyst is close to the adsorption limit amount, the amount of the absorbed NOx exceeds the adsorption limit amount soon when the operation in which the exhaust air-fuel ratio becomes lean is carried out after the restart of the internal combustion engine. Consequently, in the patent document 1, there is case where even if the operation in which the exhaust air-fuel ratio becomes lean is carried out after the restart of the internal combustion engine, the operation needs to be immediately shifted to the operation in which the exhaust air-fuel ratio becomes rich.

That is, in the patent document 1, there is possibility that during the operation at a lean air-fuel ratio after the restart of the internal combustion engine, air-fuel shifting is carried out which includes, for example, shifting the air-fuel ratio to a rich air-fuel ratio, and returning the air-fuel ratio to a lean air-fuel ratio after removing NOx, and consequently, fuel economy and exhaust performance deteriorate.

An internal combustion engine of the present invention is mounted on a hybrid vehicle including a traveling mode to travel only with the driving force of a drive motor, and is capable of being operated at an air-fuel ratio leaner than the theoretical air-fuel ratio. Then, in consideration of the NOx adsorption ratio of a NOx purification catalyst provided in an exhaust passage of the internal combustion engine, it is determined whether to stop the internal combustion engine in an operation state.

According to the present invention, for example, it becomes possible to stop easier the internal combustion engine when the NOx adsorption ratio is high, and, at the time of the restart of the stopped internal combustion engine, the NOx is removed, thereby becoming possible to suppress to carry out air-fuel shifting including, for example, shifting the air-fuel ratio to an air-fuel ratio richer than the theoretical air-fuel ratio during the operation at an air-fuel ratio leaner than the theoretical air-fuel ratio, and retuning the air-fuel to a lean air-fuel ratio again after removing the NOx. Consequently, in the internal combustion engine, the deterioration of fuel economy and exhaust performance can be totally suppressed.

BRIEF DESCRIPTION OF THE DRAWINGS

FIG. 5 is an explanatory view showing one example of a power threshold calculation map prepared in each NOx adsorption ratio.

MODE FOR IMPLEMENTING THE INVENTION

In the following, an embodiment of the present invention will be explained in detail based on the drawings.

Figure 1:
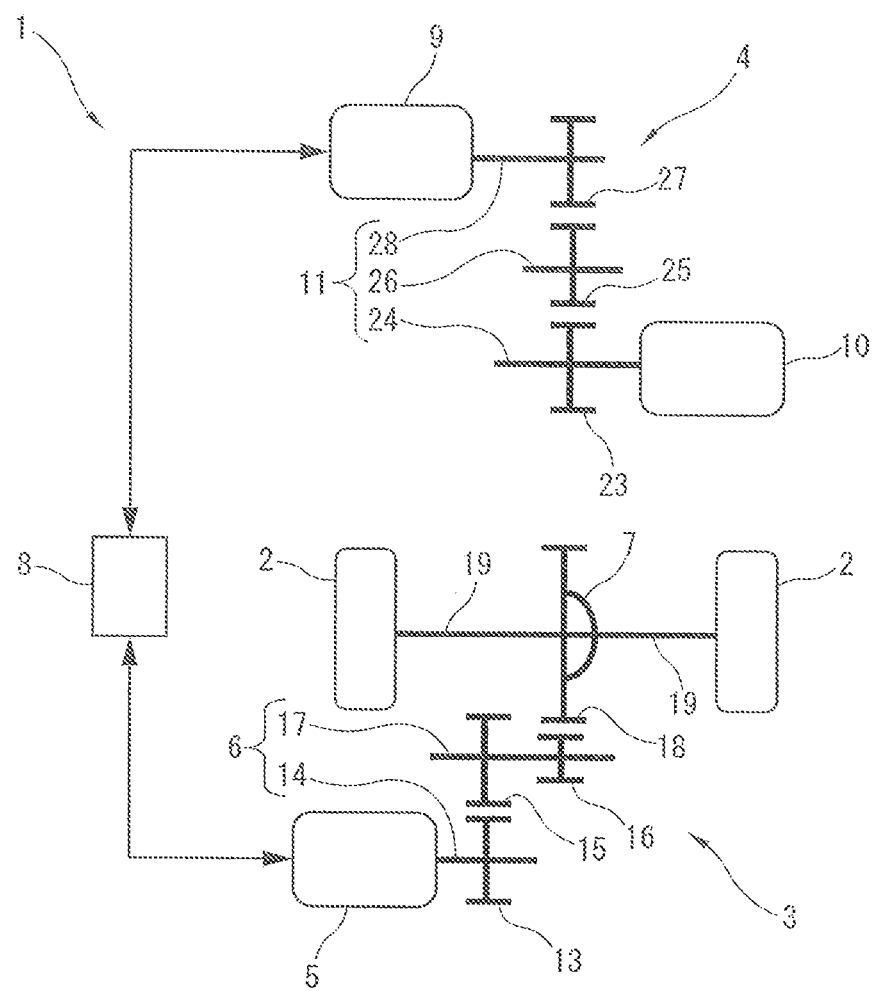
FIG. 1 is an explanatory view schematically showing a driving system of a vehicle to which the present invention is applied.
Figure 2:
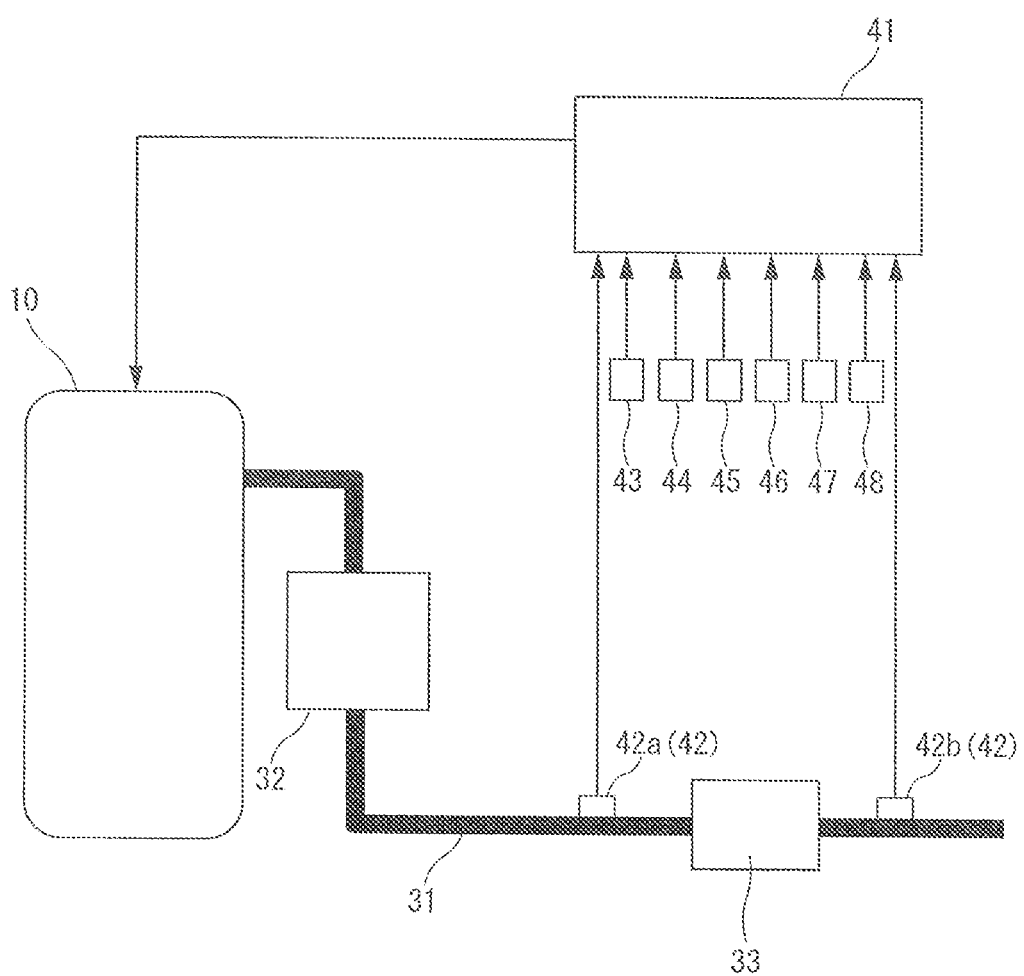
FIG. 2 is an explanatory view schematically showing a system configuration of an internal combustion engine according to the present invention.

FIG. 1 is an explanatory view schematically showing a driving system of a vehicle 1 to which the present invention is applied. FIG. 2 is an explanatory view schematically showing a system configuration of an internal combustion engine 10 according to the present invention.

Vehicle 1 is, for example, a hybrid vehicle, and includes a driving unit 3 for driving drive wheels 2, and a power generation unit 4 for generating electric power for driving drive wheels 2.

Driving unit 3 includes a drive motor 5 as an electric motor for rotatably driving drive wheels 2, and a first gear train 6 and a differential gear 7 for transmitting the driving force of drive motor 5 to drive wheels 2. The electric power from a battery 8 which is charged with electric power generated by power generation unit 4 is supplied to drive motor 5.

Power generation unit 4 includes a generator 9 for generating the electric power to be supplied to drive motor 5, an internal combustion engine 10 for driving generator 9, and a second gear train 11 for transmitting the rotation of internal combustion engine 10 to generator 9.

Vehicle 1 of the present embodiment is a so-called series hybrid vehicle in which internal combustion engine 10 is not used as motive power. That is, in vehicle 1 of the present embodiment, internal combustion engine 10 is only used for generating electric power, and drive motor 5 drives drive wheels 2 for traveling. For example, in vehicle 1, when the remaining amount (remaining charge amount) of battery 8 becomes low, generator 9 is driven by driving internal combustion engine 10 to generate electric power to charge battery 8. That is, vehicle 1 includes a traveling mode to travel only with the driving force of drive motor 5.

Drive motor 5 is a direct drive source of vehicle 1, and is driven by, for example, AC power from battery 8. For example, drive motor 5 is composed of a synchronous motor in which a permanent magnet is used to a rotor.

In addition, drive motor 5 functions as a generator at the time of the deceleration of vehicle 1. That is, drive motor 5 is a generator motor which is capable of charging battery 8 with regenerative energy, as electric power, generated at the time of the vehicle deceleration.

First gear train 6 reduces the rotation of drive motor 5 and increases motor toque so as to ensure traveling drive torque.

First gear train 6 is, for example, a double reduction gear train, and includes a motor shaft 14 equipped with a drive unit first gear 13, and a first idler shaft 17 equipped with a drive unit second gear 15 and a drive unit third gear 16. Motor shaft 14 is the rotation shaft of drive motor 5.

Drive unit first gear 13 meshes with drive unit second gear 15.

Drive unit third gear 16 meshes with an input-side gear 18 provided on the input side of differential gear 7.

Differential gear 7 transmits the driving torque input from first gear train 6 via input-side gear 18 to right and left drive wheels 2 and 2 via right and left drive shafts 19 and 19. Differential gear 7 is capable of transmitting the same driving torque to right and left drive wheels 2 and 2, while allowing the rotation speed difference between right and left drive wheels 2 and 2.

For example, generator 9 is composed of a synchronous motor in which a permanent magnet is used to a rotor. Generator 9 converts the rotation energy generated by internal combustion engine 10 into electric energy to charge, for example, battery 8. In addition, generator 9 also has a function as an electric motor for driving internal combustion engine 10, and functions as a starter motor at the time of the start of internal combustion engine 10. That is, generator 9 is a generator motor, is capable of supplying the generated electric power to battery 8, and is capable of being rotatably driven by the electric power from battery 8.

In addition, for example, the electric power generated by generator 9 is not used for charging battery 8, but may be directly supplied to drive motor 5 according to a driving condition. Moreover, for example, the start of internal combustion engine 10 may be carried out by a special starter motor different from generator 9.

Second gear train 11 is a gear train connecting internal combustion engine 10 and generator 9. Second gear train 11 includes an engine shaft 24 equipped with a power generation unit first gear 23, a second idler shaft 26 equipped with a power generation unit second gear 25, and a generator input shaft 28 equipped with a power generation unit third gear 27.

During power generation operation, second gear train 11 increases the rotation speed of internal engine 10, and transmits a required engine torque to generator 9. When generator 9 functions as a starter, second gear train 11 reduces the rotation speed of generator 9, and transmits a required motor torque to internal combustion engine 10.

Engine shaft 24 synchronously rotates with the crankshaft (not shown) of internal combustion engine 10. Generator input shaft 28 synchronously rotates with the rotor (not shown) of generator 9.

Power generation unit first gear 23 meshes with power generation unit second gear 25. Power generation unit third gear 27 meshes with power generation unit second gear 25. That is, power generation unit first gear 23 and power generation unit third gear 27 mesh with power generation unit second gear 25.

Internal combustion engine 10 is capable of changing an air-fuel ratio. Internal combustion engine 10 is, for example, a gasoline engine disposed inside the engine room positioned on the front side of vehicle 1.

As shown in FIG. 2, an exhaust passage 31 of internal combustion engine 10 is provided with an upstream-side exhaust purification catalyst 32 and a downstream-side exhaust purification catalyst 33 as a NOx purification catalyst.

Upstream-side exhaust purification catalyst 32 is composed of, for example, a three-way catalyst. The three-way catalyst is one for purifying exhaust gas discharged from internal combustion engine 10, and when an excess air ratio is approximately "1", namely, when an exhaust gas air-fuel ratio is approximately the theoretical air-fuel ratio, the purification ratio of each of three components of HC, CO, and NOx in exhaust gas which flows thereinto becomes high.

Downstream-side exhaust purification catalyst 33 is positioned more on the downstream side than upstream-side exhaust purification catalyst 32. Downstream-side exhaust purification catalyst 33 is composed of a NOx trap catalyst (INT; Lean NOx Trap Catalyst). The NOx trap catalyst is one absorbing NOx in exhaust gas during the operation when the air-fuel ratio is an air-fuel ratio leaner than the theoretical air-fuel ratio, and desorbing and reducing (purifying) NOx during the operation when the air-fuel ratio is an air-fuel ratio richer than the theoretical air-fuel ratio. In other words, the NOx trap catalyst absorbs NOx in exhaust gas when the exhaust gas air-fuel ratio is lean, and performs the adsorption-reduction purification of the absorbed NOx by using HC (hydrocarbon) and GO, as reducing agents, in exhaust gas when the exhaust air-fuel ratio is rich.

An upstream-side NOx sensor 42a is disposed between upstream-side exhaust purification catalyst 32 and downstream-side exhaust purification catalyst 33. A downstream-side NOx sensor 42b is provided on the downstream side of downstream-side exhaust purification catalyst 33. That is, a NOx sensor 42 is provided to the front and rear of downstream-side exhaust purification catalyst 33. Upstream-side NOx sensor 42a and downstream-side NOx sensor 42b are ones for detecting the concentration of NOx in exhaust gas. The detection signals of upstream-side NOx sensor 42a and downstream-side NOx sensor 42b are input to a control unit 41.

Control unit 41 is a well-known digital computer equipped with a CPU, a ROM, a RAM and an input/output interface.

Control unit 41 is input with detection signals of sensors such as an air flow meter 43 for detecting an intake air amount, a crank angle sensor 44 for detecting the crank angle of a crankshaft, an accelerator opening sensor 45 for detecting the depression amount of the accelerator pedal, a vehicle speed sensor 46 for detecting vehicle speed, a water temperature sensor 47 for detecting the temperature of the cooling water of internal combustion engine 10, and an oil temperature sensor 48 for detecting the temperature of the lubricant of internal combustion engine 10. Crank angle sensor 44 is one capable of detecting the engine speed of internal combustion engine 10.

Control unit 41 calculates, by using the detection value of accelerator opening sensor 45, power consumption that is the amount of power required for vehicle traveling. In addition, although the power consumption of the vehicle is the sum of the power consumed by drive motor 5 and the power consumed by other auxiliary machinery, by selecting a power set value close to this sum from a plurality of power set values previously discretely set, the power consumption of the vehicle may be obtained. In addition, control unit 41 is capable of detecting a SOC (State Of Charge) that is a ratio of a remaining charge amount with respect to the charge capacity of battery 8.

Control unit 41 calculates the NOx adsorption ratio of downstream-side exhaust purification catalyst 33 from the adsorption amount of NOx absorbed in downstream-side exhaust purification catalyst 33. The NOx adsorption ratio of downstream-side exhaust purification catalyst 33 is the ratio of a NOx adsorption amount to the maximum value (adsorption limit value) of a NOx amount that can be absorbed by downstream-side exhaust purification catalyst 33.

Control unit 41 calculates the adsorption amount of NOx absorbed in downstream-side exhaust purification catalyst 33 by using the difference between the detection value of upstream-side NOx sensor 42a and the detection value of downstream-side NOx sensor 42b.

In addition, control unit 41 may be configured to, in order to calculate the adsorption amount of NOx of downstream-side exhaust purification catalyst 33, obtain a NOx adsorption amount per unit of time from a predetermined date and the like previously stored in a ROM of control unit 41, such as the engine speed and the fuel injection amount of internal combustion 10 as parameters, and then integrate it. In addition, the NOx adsorption amount of downstream-side exhaust purification catalyst 33 may be calculated by wall-known methods other than the above method.

Control unit 41 controls the air-fuel ratio of internal combustion engine 10 while optimally controlling the ignition timing, the intake air amount and the like of internal combustion engine 10, based on the detection signals of sensors. That is, control unit 41 corresponds to a control unit for controlling the operation of internal combustion engine 10.

When operating internal combustion engine 10, control unit 41 basically controls the air-fuel ratio so as to be a lean air-fuel ratio (air-fuel ratio leaner than the theoretical air-fuel ratio), and controls, in case where combustion stability cannot be ensured at a lean air-fuel ratio, the air-fuel ratio so as to be the theoretical air-fuel ratio or an air-fuel ratio richer than the theoretical air-fuel ratio. In addition, in case where the after-mentioned rich spike is carried out, control unit 41 controls the air-fuel ratio so as to be an air-fuel ratio richer than the theoretical air-fuel ratio.

Then, control unit 41 stops internal combustion engine 10 (automatic stop) when a predetermined stop request is made during the operation of internal combustion engine 10, and restarts internal combustion engine 10 (automatic restart) when a predetermined start request is made during the stopping of internal combustion engine 10 and the traveling of vehicle 1.

Control unit 41 determines that a stop request is made when the power consumption of the vehicle becomes equal to or lower than a power threshold set according to the vehicle speed, the SOC of battery 8 and the NOx adsorption ratio of downstream-side exhaust purification catalyst 33 or when the NOx adsorption ratio of downstream-side exhaust purification catalyst 33 becomes equal to or higher than a predetermined first NOx adsorption ratio threshold A1 which has been previously set, during the operation of internal combustion engine 10.

For example, the power threshold is calculated by using a plurality of power threshold calculation maps (mentioned below) prepared for respective NOx adsorption ratios. The power threshold is set so as to be larger as the NOx adsorption ratio of downstream-side exhaust purification catalyst 33 becomes higher. Consequently, internal combustion engine 10 easily stops as the NOx adsorption ratio of downstream-side exhaust purification catalyst 33 becomes higher.

First NOx adsorption ratio threshold A1 is a value close to the limit of the NOx adsorption ratio (NOx adsorption ratio: 100%) of downstream-side exhaust purification catalyst 33, and, in the present embodiment, it is set to, for example, 95% in the NOx adsorption ratio.

Then, control unit 41 determines that a start request is made when the power consumption of the vehicle becomes larger than a power threshold or when the SOC of battery 8 becomes equal to or lower than a predetermined SOC lower limit value, during the stopping of internal combustion engine 10 in the operation state of vehicle 1.

In downstream-side exhaust purification catalyst 33, when the operation of internal combustion engine 10 is carried out at a lean air-fuel ratio, the NOx adsorption ratio increases, and it is therefore necessary to carry out NOx purge for desorbing and reducing the absorbed NOx.

In this case, when the NOx purge of downstream-side exhaust purification catalyst 33 is carried out, for example, control unit 41 (internal combustion engine 10) carries out rich spike for shifting the air-fuel ratio to an air-fuel ratio richer than the theoretical air-fuel ratio by temporarily increasing the fuel injection amount of internal combustion engine 10.

Figure 3:
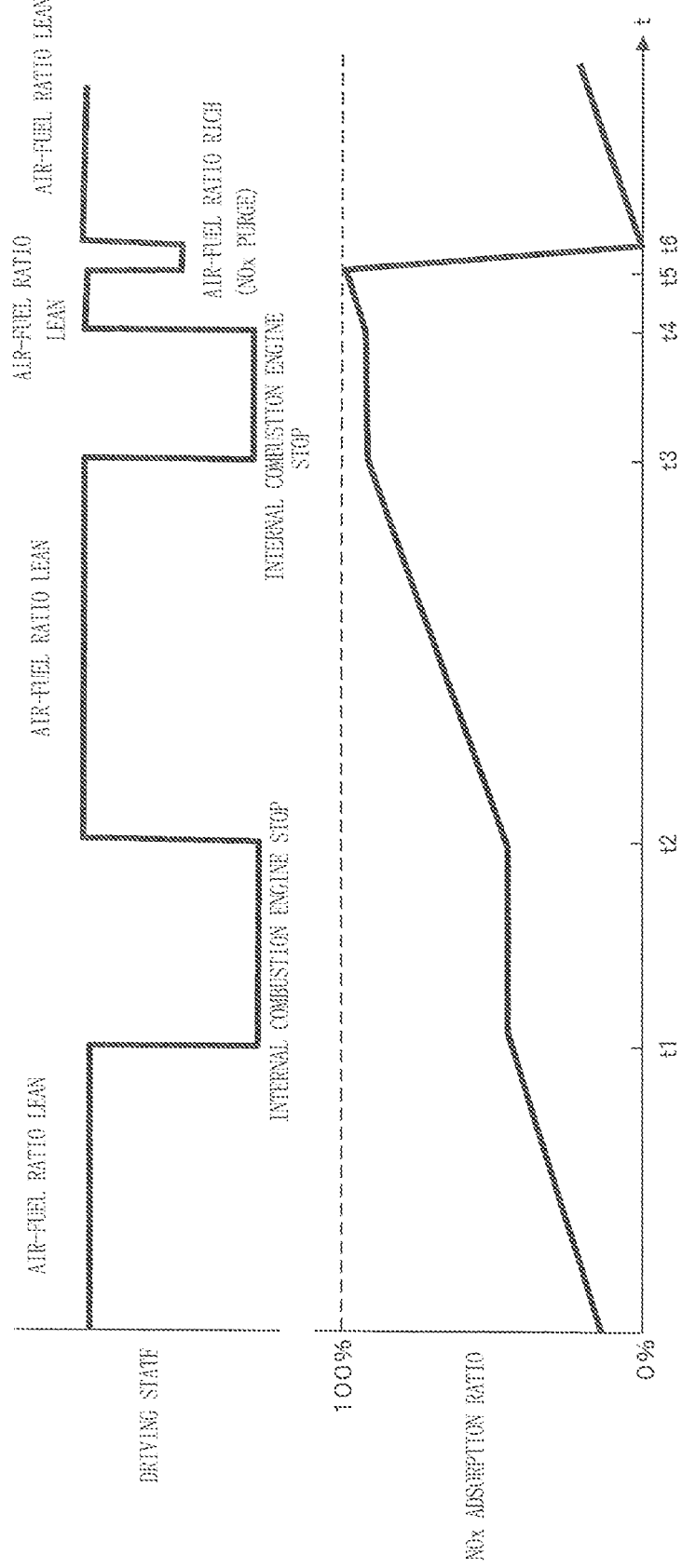
FIG. 3 is a timing chart showing one example of the operation of an internal combustion engine in a comparative embodiment.

FIG. 3 is a timing chart showing one example of the operation of internal combustion engine 10 in a comparative embodiment. In the comparative embodiment shown in FIG. 3, at the timing when the NOx adsorption ratio of downstream-side exhaust purification catalyst 33 reaches the adsorption limit (100%), the desorption and reduction of NOx absorbed in downstream-side exhaust purification catalyst 33 is carried out.

In the comparative embodiment, at the timing of a time t1 in FIG. 3, a stop request of internal combustion engine 10 is made, and internal combustion engine 10 in an operation state at a lean air-fuel ratio is stopped.

Since a start request of internal combustion engine 10 is made at the timing of a time t2 of FIG. 3, internal combustion engine 10 is restarted at the timing of time t2 of FIG. 3, and the operation of internal combustion engine 10 at a lean air-fuel ratio is restated. The NOx adsorption ratio of downstream-side exhaust purification catalyst 33 does not increase or decrease during a period from time t1 to time t2 in FIG. 3 when internal combustion engine 10 is stopped.

Since a stop request of internal combustion engine 10 is made at the timing of a time t3 in FIG. 3, internal combustion engine 10 is stopped at the time of time t3 in FIG. 3. The NOx adsorption ratio of downstream-side exhaust purification catalyst 33 increases until internal combustion engine 10 is stopped at the timing of time t3 after internal combustion engine 10 is started at the timing of time t2 in FIG. 3.

Since a start request of internal combustion engine 10 is made at the timing of a time t4 in FIG. 3, internal combustion engine 10 is restarted at the timing of time t4 in FIG. 3, and the operation of internal combustion engine 10 at a lean air-fuel ratio is restarted. The NOx adsorption ratio of downstream-side exhaust purification catalyst 33 does not increase or decrease during a period from time t3 to time t4 in FIG. 3 when internal combustion engine 10 is stopped.

Then, the NOx adsorption ratio of downstream-side exhaust purification catalyst 33 increases from the timing of time t4 in FIG. 3, and then reaches the adsorption limit (100%) at the timing of a time t5 in FIG. 3. Control unit 41 (internal combustion engine 10) therefore starts the rich spike from the timing of time t5 in FIG. 3. This rich spike is carried out such that all of NOx absorbed in downstream-side exhaust purification catalyst 33 is desorbed and reduced. That is, the rich spike is carried out until the NOx adsorption ratio of downstream-side exhaust purification catalyst 33 becomes 0%.

At the timing of a time t6 in FIG. 3 when the NOx adsorption amount of downstream-side exhaust purification catalyst 33 becomes "0", the rich spike is ended, and the operation of internal combustion engine 10 at a lean air-fuel is restarted. The NOx adsorption ratio of downstream-side exhaust purification catalyst 33 increases from the timing of time t6 in FIG. 3.

In the comparative embodiment shown in FIG. 3, since the NOx purge becomes necessary during the operation of internal combustion engine 10 at a lean air-fuel ratio, the air-fuel ratio needs to be shifted twice in the order of "lean air-fuel ratio→rich air-fuel ratio→lean air-fuel ratio" during the operation of internal combustion engine 10. Here, the shifting of the air-fuel ratio from a lean air-fuel ratio to a rich air-fuel ratio and the shifting of the air-fuel ratio from a rich air-fuel ratio to a lean air-fuel ratio become a factor causing the deterioration of the fuel economy performance and the exhaust performance of internal combustion engine 10.

Therefore, in the present embodiment, by carrying out the NOx purge at the time of the start of internal combustion engine 10, the number of times of the shifting of the air-fuel ratio in internal combustion engine 10 in the operation state is reduced. In order to achieve this, internal combustion engine 10 is stopped when the NOx adsorption ratio of downstream-side exhaust purification catalyst 33 becomes high, such that the NOx adsorption ratio of downstream-side exhaust purification catalyst 33 does not reach the adsorption limit (100%), during the operation at a lean air-fuel ratio.

Specifically, internal combustion engine 10 is stopped before the NOx adsorption ratio of downstream-side catalyst 33 reaches the limit such that the NOx adsorption ratio of downstream-side exhaust purification catalyst 33 does not reach the adsorption limit (100%), during the operation of internal combustion engine 10 at a lean air-fuel ratio, and the NOx purge is carried out at a timing when a start request of internal combustion engine 10 is made.

More specifically, when the power consumption of the vehicle becomes equal to or lower than a power threshold set according to the vehicle speed, the SOC of battery 8 and the NOx adsorption ratio of downstream-side exhaust purification catalyst 33, control unit 41 determines that a stop request is made, and then stops internal combustion engine 10. In other words, control unit 41 determines whether to stop internal combustion engine 10 during operation by using the vehicle speed of vehicle 1, the SOC of battery 8 and the NOx adsorption ratio of downstream-side exhaust purification catalyst 33.

In addition, control unit 41 determines that a stop request is also made when the NOx adsorption ratio of downstream-side exhaust purification catalyst 33 becomes first NOx adsorption ratio threshold A1 or higher during the operation of internal combustion engine 10, and then stops internal combustion engine 10.

Consequently, internal combustion engine 10 can be stopped before the NOx adsorption amount of downstream-side exhaust purification catalyst 33 reaches the limit. Therefore, in order to remove the NOx absorbed in downstream-side exhaust purification catalyst 33, internal combustion engine 10 can be operated without shifting the air-fuel to an air-fuel ratio richer than the theoretical air-fuel ratio during the operation at an air-fuel ratio leaner than the theoretical air-fuel ratio.

That is, in order to remove the NOx of downstream-side exhaust purification catalyst 33, in internal combustion engine 10, there is no necessary to carry out the air-fuel shifting including shifting the air-fuel ratio to a rich air-fuel ratio during the operation at a lean air-fuel ratio, and retuning the air-fuel to a lean air-fuel ratio after removing the NOx, and thereby the number of times of the shifting of the air-fuel ratio during the operation can be reduced as compared with the above-mentioned comparative embodiment. Consequently, in internal combustion engine 10, the deterioration of fuel economy and exhaust performance can be totally suppressed.

In addition, control unit 41 prohibits a lean operation for setting the air-fuel ratio so as to be an air-fuel ratio leaner than the theoretical air-fuel ratio, when the NOx adsorption ratio of downstream-side exhaust purification catalyst 33 is equal to or higher than first NOx adsorption ratio threshold A1, at the time of the start of internal combustion engine 10.

Consequently, the NOx adsorption ratio of downstream-side exhaust purification catalyst 33 can be avoided from reaching the adsorption limit during the operation of internal combustion engine at a lean air-fuel ratio, and thereby the deterioration of the exhaust performance of internal combustion engine 10 can be suppressed.

Then, at the time of the start after internal combustion engine 10 is stopped when the power consumption of the vehicle becomes lower than a power threshold in the aftermentioned threshold variation area C, control unit 41 controls the air-fuel ratio so as to be richer than at least the theoretical air-fuel ratio to carry out the NOx purge of downstream-side exhaust purification catalyst 33. In addition, when the NOx adsorption ratio of downstream-side exhaust purification catalyst 33 is equal to or higher than first NOx adsorption ration threshold A1 at the time of the start of internal combustion engine 10, control unit 41 controls the air-fuel ratio so as to be richer than at least the theoretical air-fuel ratio to carry out the NOx purge of downstream-side exhaust purification catalyst 33.

With this, in internal combustion engine 10, the NOx absorbed in downstream-side exhaust purification catalyst 33 can be removed at the time of the start, and it is no necessary to shift the air-fuel ratio to a rich air-fuel ratio to remove the NOx absorbed in downstream-side exhaust purification catalyst 33 during the operation at a lean air-fuel ratio. That is, in internal combustion engine 10, it becomes unnecessary to carry out the shifting of the air-fuel ratio including shifting to the operation at a rich air-fuel ratio, during the operation at a lean air-fuel ratio, to remove the NOx of downstream-side exhaust purification catalyst 33, and shifting to the operation at a lean air-fuel ratio after the removing of the NOx of downstream-side exhaust purification catalyst 33.

In addition, in case where combustion stability cannot be ensured at a lean air-fuel ratio at the time of the start of internal combustion engine 10, namely, in case where it is necessary to set the air-fuel ratio to the theoretical air-fuel ratio or an air-fuel ratio richer than the theoretical air-fuel ratio at the time of the start of internal combustion engine 10, if the NOx adsorption ratio of downstream-side exhaust purification catalyst 33 is equal to or higher than a predetermined second NOx adsorption ratio threshold A2 smaller than first NOx adsorption ratio threshold A1, control unit 41 starts internal combustion engine 10 at an air-fuel ratio richer than the theoretical air-fuel ratio, so as to remove NOx absorbed in downstream-side exhaust purification catalyst 33.

In this way, when the operation cannot be carried out at a lean air-fuel ratio at the time of the start of internal combustion engine 10, by carrying out the NOx purge, the NOx of downstream-side exhaust purification catalyst 33 can be efficiently removed.

In addition, cases where the air-fuel ratio needs to be set to the theoretical air-fuel ratio or an air-fuel ratio richer than the theoretical air-fuel ratio at the time of the start of internal combustion engine 10, namely, cases where the air-fuel ratio cannot be set to a lean air-fuel ratio at the time of the start of internal combustion engine 10 includes, for example, a case where the operation is carried out in an operation area in which the air-fuel ratio is not set to a lean air-fuel ratio immediately after the start of internal combustion engine 10, a case where the temperature of the cooling water of internal combustion engine 10 is low, and a case where the temperature of the lubricant of internal combustion engine 10 is low. Here, it is sufficient that second NOx adsorption ratio threshold A2 is a value smaller than first NOx adsorption ratio threshold A1, and, in the present embodiment, it is set to, for example, 30% in a NOx adsorption ratio. In addition, second NOx adsorption ratio threshold A2 can be set to 0% in a NOx adsorption ratio.

Figure 4:
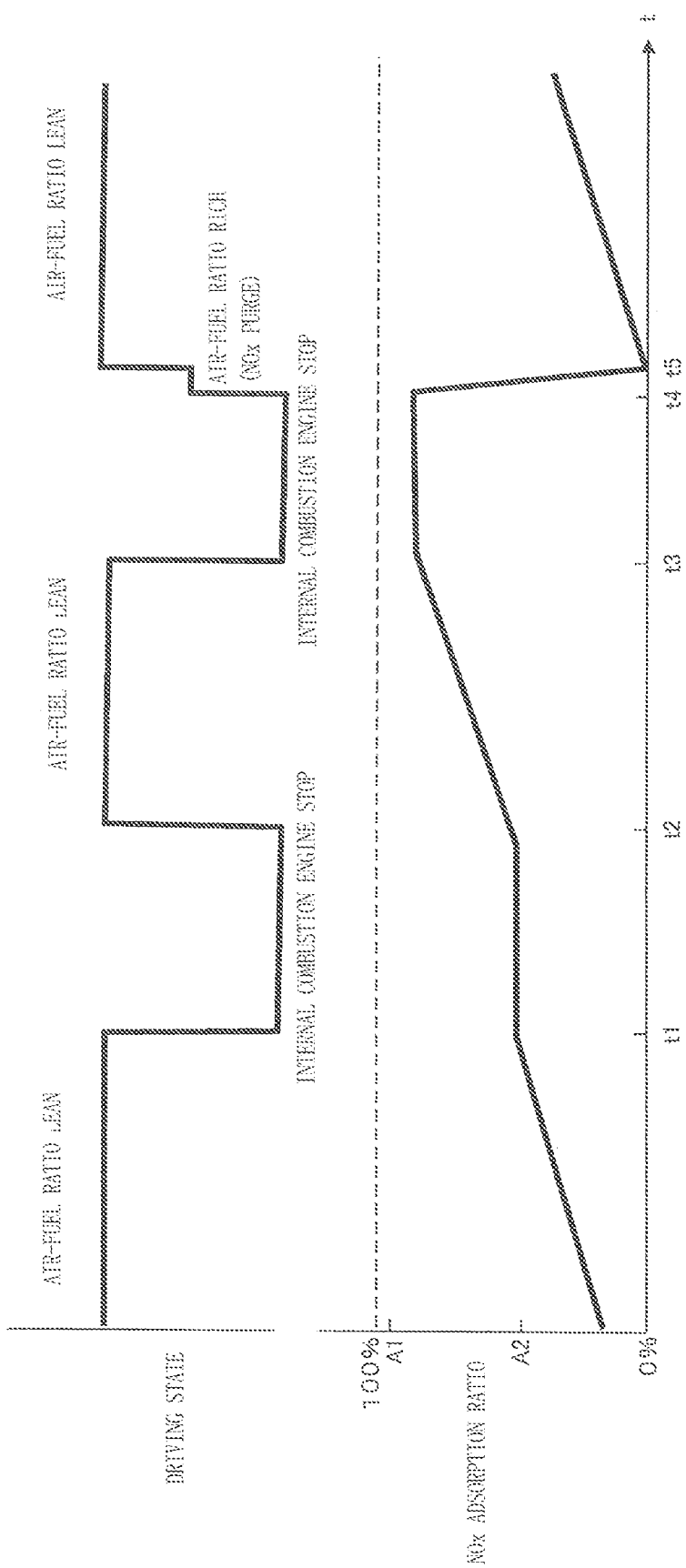
FIG. 4 is a timing chart showing one example of the operation of the internal combustion engine according to the present invention.

FIG. 4 is a timing chart showing one example of the operation of internal combustion engine 10 according to the above-mentioned embodiment of the present invention. In the present embodiment shown in FIG. 4, by carrying out NOx purge at the time of the start of internal combustion engine 10, the number of times of the shifting of the air-fuel ratio in internal combustion engine 10 in an operation state can be reduced.

In internal combustion engine 10 of the present embodiment, a stop request of internal combustion engine 10 is made at the timing of a time t1 in FIG. 4, and internal combustion engine 10 in operation at a lean air-fuel ratio is stopped.

Since a start request of internal combustion engine 10 is made at the timing of a time t2 in FIG. 4, the operation of internal combustion engine 10 is restarted at the timing of t2 in FIG. 4, and the operation at a lean air-fuel ratio is restarted. The NOx adsorption ratio of downstream-side exhaust purification catalyst 33 dose not increase or decrease during a period from time t1 to t2 in FIG. 4 when internal combustion engine 10 is stopped.

Since, at the timing of time t3 in FIG. 4, the power consumption of the vehicle becomes smaller than a power threshold in threshold variation area C, and a stop request of internal combustion engine 10 is made, internal combustion engine 10 is stopped at the timing of time t3 in FIG. 4. The NOx adsorption ratio of downstream-side exhaust purification catalyst 33 increases until internal combustion engine 10 is stopped at the timing of time t3 after the start of internal combustion engine 10 at the timing of time t2 in FIG. 4.

A start request of internal combustion engine 10 is made at the timing of a time t4 in FIG. 4, and internal combustion engine 10 is restated at the timing of time t4 in FIG. 4. The NOx adsorption ratio of downstream-side catalyst 33 does not increase or decrease during a period from time t3 to time t4 in FIG. 4 when internal combustion engine 10 is stopped.

Then, since the start of internal combustion engine 10 is carried out at the timing of time t4 in FIG. 4 after internal combustion engine 10 is stopped on the basis that the power consumption of the vehicle becomes smaller than a power threshold in threshold variation area C, control unit 41 (internal combustion engine 10) starts rich spike at the timing of time t4 in FIG. 4. This rich spike is carried out so as to desorb and reduce all of the NOx absorbed in down-stream-side exhaust purification catalyst 33. That is, the rich spike is carried out until the NOx adsorption ratio of downstream-side exhaust purification catalyst 33 becomes 0%.

The rich spike is ended at the timing of a time t5 in FIG. 4 when the NOx adsorption amount of downstream-side exhaust purification catalyst 33 becomes "0", and the operation of internal combustion engine 10 at a lean air-fuel ratio is restarted. The NOx adsorption ratio of downstream-side exhaust purification catalyst 33 increases from the timing of a time t6 in FIG. 4.

In the embodiment shown in FIG. 4, it is possible to avoid a NOx purge request during the operation of internal combustion engine 10 at a lean air-fuel. That is, the NOx purge of downstream-side exhaust purification catalyst 33 is carried out at the time of the start of internal combustion engine 10 in a stopping state. The shifting of the air-fuel ratio accompanying the NOx purge in the above-mentioned embodiment is therefore only the shifting of the air fuel ratio from a rich air-fuel ratio to a lean air-fuel ratio. That is, by carrying out only one time of the shifting of the air-fuel ratio during the operation of internal combustion engine 10, the NOx purge of downstream-side exhaust purification catalyst 33 becomes possible, and thereby the deterioration of the fuel economy performance and the exhaust performance of internal combustion engine 10 can be suppressed.

In addition, by carrying out the rich spike at the time of the start of internal combustion engine 10, while using HC which increases at the time of the start, the NOx purge can be carried out.

In addition, in vehicle 1, by increasing the capacity of battery 8, SOC balance can be easily ensured by the charge after the next start.

FIG. 5 shows one example of a plurality of power threshold calculation maps prepared for respective NOx adsorption ratios (LNT adsorption ratios) of downstream-side exhaust purification catalyst 33. In addition, a plurality of power threshold calculation maps corresponding to NOx adsorption ratios (LNT adsorption ratios) other than those shown in FIG. 5 may be prepared.

In FIG. 5, there are shown a power threshold calculation map in which the NOx adsorption ratio (LNT adsorption ratio) is 0%, a power threshold calculation map in which the NOx adsorption ratio (LNT adsorption ratio) is 70%, a power threshold calculation map in which the NOx adsorption ratio (LNT adsorption ratio) is 80%, and a power threshold calculation map in which the NOx adsorption ratio (LNT adsorption ratio) is 90%. In addition, in each of the maps, for convenience, the display of specific numerical values in areas in which the SOC of battery 8 is low is omitted, and only specific numerical values in areas in which the SOC of battery 8 is high are displayed. In each of the maps, actually, power thresholds are also set in each area in which a specific numerical value is not displayed. For example, if the vehicle speed is the same, a power threshold is set such that the lower the SOC of battery 8 is, the smaller the value of the power threshold is.

In each of the power threshold calculation maps, basically, if the vehicle speed of vehicle 1 and the SOC of battery 8 are under the same condition, the same power thresholds as other power threshold power calculation maps are set regardless of the NOx adsorption ratio of downstream-side exhaust purification catalyst 33. However, in each of the power threshold calculation maps in which the NOx adsorption is high, in a predetermined threshold variation area C in which the vehicle speed of vehicle 1 is low and the SOC of battery 8 is high, power thresholds different from those in the power threshold calculation maps in which the NOx adsorption ratio is low are set. In other words, of the power threshold calculation maps, the power threshold calculation maps in which the NOx adsorption ratio is high each have a predetermined power threshold variation area C in which values different from those in the power threshold calculation maps in which the NOx adsorption ratio is low are set.

The values of the power thresholds set in threshold variation area C are larger than those of the power thresholds under the same conditions (vehicle speed of vehicle 1 and the SOC of battery 8) in the power threshold calculation maps in which the NOx adsorption ratio is low and threshold variation area C is not set. In other words, in each of the power thresholds, a value set in predetermined threshold variation area C in which the vehicle speed of vehicle 1 is low, the SOC of battery 8 is high, and the NOx adsorption ratio of downstream-side exhaust purification catalyst 33 is high is different from a value set in a predetermined normal area in which the vehicle speed of vehicle 1 is low, the SOC of battery 8 is high and the NOx adsorption ratio of downstream-side exhaust purification catalyst 33 is low.

In the present embodiment, threshold variation area C is set in the power threshold calculation map in which the NOx adsorption ratio is 80% and the power threshold calculation map in which the NOx adsorption ratio is 90% in FIG. 5. In addition, in the present embodiment, threshold variation area C is not set in the power threshold calculation map in which the NOx adsorption ratio is 70% and the power threshold calculation map in which the NOx adsorption ratio is 0% in FIG. 5.

Specifically, the threshold variation area C is an area surrounded by a thick line in each of the power threshold calculation map in which the NOx adsorption ratio is 80% and the power threshold calculation map in which the NOx adsorption ratio is 90% in FIG. 5. More specifically, threshold variation area C in the power threshold calculation map in which the NOx adsorption ratio is 80% is an area obtained by adding the area in which the vehicle speed is 10 km/h and the SOC of battery 8 is 80% and 85%, and the area in which the vehicle speed is 20 km/h and the SOC of battery 8 is 80% and 85%. In addition, threshold variation area C in the power threshold calculation map in which the NOx adsorption ratio is 90% is an area obtained by adding the area in which the vehicle speed is 10 km/h and the SOC of battery 8 is 75%, 80% and 85%, and the area in which the vehicle speed is 20 km/h and the SOC of battery 8 is 85%.

The threshold variation area C is an area in which fuel economy is improved by carrying out the NOx purge at the time of the start after stopping internal combustion engine 10 earlier (in order to remove the NOx absorbed in downstream-side exhaust purification catalyst 33 by setting the air-fuel ratio so as to be richer than the theoretical air-fuel ratio). In other words, in the power threshold calculation maps in which the NOx adsorption ratio is high, the value of each of the power thresholds is set higher in the area (threshold variation area C) in which fuel economy is improved by setting the air-fuel ratio so as to be richer than the theoretical air-fuel ratio at the time of the start after stopping internal combustion engine 10 earlier to remove the NOx absorbed in downstream-side exhaust purification catalyst 33.

In addition, the power threshold calculation map in which the NOx adsorption ratio is 0% is the same as the power threshold calculation map in which the NOx adsorption ratio is 70%. That is, in the range from 0% to 70% in the NOx adsorption ratio of downstream-side exhaust purification catalyst 33, if the vehicle speed of vehicle 1 and the SOC of battery 8 are under the same conditions, in each of all the areas, the power threshold is the same value regardless of the NOx adsorption ratio of downstream-side exhaust purification catalyst 33.

In internal combustion engine 10, there is case where fuel economy is improved by carrying out the NOx purge at the time of the start after stopping the operation earlier when the NOx adsorption ratio of downstream-side exhaust purification catalyst 33 becomes high.

Therefore, the power thresholds in threshold variation area C in which the vehicle speed of vehicle 1 is low and the SOC of battery 8 is high are set to values different from those in a normal area. In addition, the higher the NOx adsorption ratio becomes, the wider threshold variation area C becomes.

Here, in case where internal combustion engine 10 is stopped based on the result using a power threshold set in threshold variation area C, the air-fuel ratio is set to an air-fuel ratio richer than the theoretical air-fuel ratio at the time of the start, so as to remove the NOx absorbed in downstream-side exhaust purification catalyst 33. That is, in case where the power consumption of the vehicle becomes equal to or lower than a power threshold in threshold variation area C, and internal combustion engine 10 is stopped, the air-fuel ratio is set to an air-fuel ratio richer than the theoretical air-fuel ratio at the time of the start of internal combustion engine 10 to remove the NOx absorbed in downstream-side exhaust purification catalyst 33.

In addition, the values of the power thresholds of the power threshold calculation maps shown in FIG. 5 are appropriately set according to an actual machine, and are not limited to the values shown in FIG. 5, as an example.

Then, the range of threshold variation area C is not limited to the range shown in FIG. 5, as an example, and it may be extended or reduced according to an actual machine. Moreover, there is possibility that threshold variation area C is set to a map in which, for example, the NOx adsorption ratio is 80% or lower depending on an actual machine.

Figure 6:
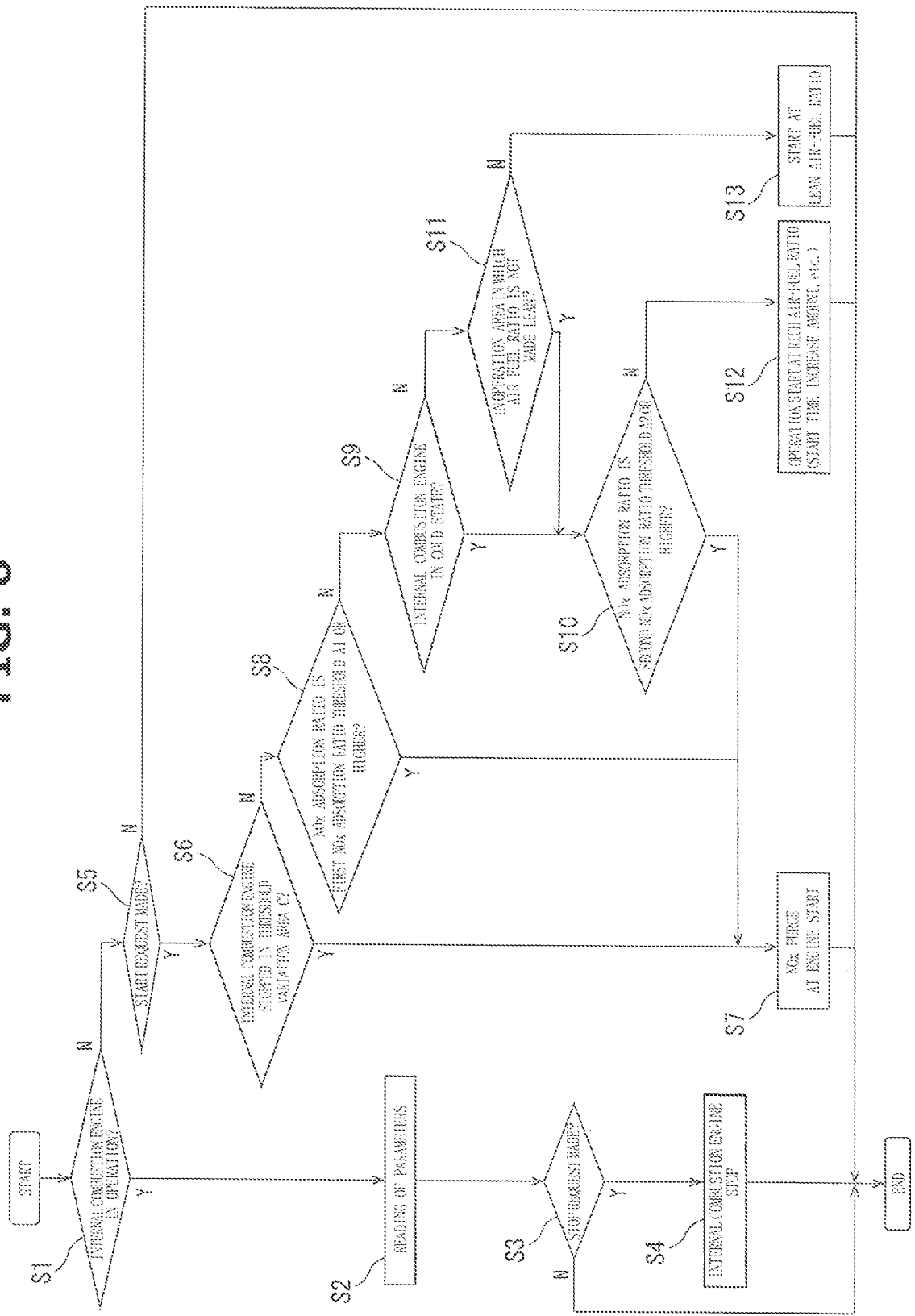
FIG. 6 is a flowchart showing one example of the flow of the control for the internal combustion engine according to the present invention.

FIG. 6 is a flowchart showing one example of the flow of the control for internal combustion engine 10 in the embodiment mentioned above. The present routine is repeatedly executed by control unit 51 every predetermined time (for example, every 10 ms) during the traveling of vehicle 1.

In a step S1, it is determined whether or not internal combustion engine 10 is in an operation state. When, in step S1, it is determined that internal combustion 10 is in the operation state, the process proceeds to a step S2. When it is determined that internal combustion engine 10 is not in the operation state, the process proceeds to a step S5.

In step S2, parameters such as the vehicle speed of vehicle 1, the SOC of battery 8 and the NOx adsorption ratio of downstream-side exhaust purification catalyst 33 are read.

In a step S3, it is determined whether or not a stop request of internal combustion engine 10 is made. When, in step S3, it is determined that the stop request of internal combustion engine 10 is made, the process proceeds to a step S4, and internal combustion engine 10 in the operation state is stopped. When, in step S3, it is determined that the stop request of internal combustion engine 10 is not made, the routine this time is ended.

In step S5, it is determined whether or not a start request of internal combustion engine 10 is made. When, in step S5, it is determined that the start request of internal combustion engine 10 is made, the process proceeds to a step S6. When, in step S5, it is determined that the start request of internal combustion engine 10 is not made, the routine this time is ended.

In step S6, it is determined whether or not the stop of internal combustion engine 10 this time is carried out on the bases that the power consumption of the vehicle becomes a power threshold or less in threshold variation area C. When, in step S6, it is determined that internal combustion engine 10 is stopped on the bases that the power consumption of the vehicle becomes a power threshold or less in threshold variation area C, the process proceeds to a step S7. When, in step S6, it is not determined that internal combustion engine 10 is stopped on the bases that the power consumption of the vehicle becomes a power threshold or less in threshold variation area C, the step proceeds to a step S8.

In step S7, the NOx purge of downstream-side exhaust purification catalyst 33 is carried out at the time of the start of internal combustion engine 10. That is, internal combustion engine 10 is started at a rich air-fuel ratio richer than the theoretical air-fuel ratio, and this rich air-fuel ratio is maintained until all of the NOx absorbed in downstream-side exhaust purification catalyst 33 is desorbed and reduced. In other words, in step S7, at the time of the start of internal combustion engine 10, the rich spike is carried out until the NOx adsorption ratio of downstream-side exhaust purification catalyst 33 becomes 0%.

In step S8, it is determined whether or not the NOx adsorption ratio of downstream-side exhaust purification catalyst 33 is equal to or higher than first NOx adsorption ratio threshold A1. When, in step S8, it is determined that the NOx adsorption ratio of downstream-side exhaust purification catalyst 33 is equal to or higher than first NOx adsorption ratio threshold A1, the process proceeds to step S7. When, in step S8, it is determined that the NOx adsorption ratio of downstream-side exhaust purification catalyst 33 is lower than first NOx adsorption ratio threshold A1, the process proceeds to a step S9.

In step S9, it is determined whether or not internal combustion engine 10 is in a cold state. Specifically, it is determined whether or not the temperature of the cooling water of internal combustion engine 10 is equal to or lower than a predetermined cooling water temperature threshold (temperature threshold) which is previously set, or it is determined whether or not the temperature of the lubricant of internal combustion engine 10 is equal to or lower than a predetermined lubricant temperature threshold (temperature threshold) which is previously set. When at least one of the cooling water temperature and the lubricant temperature of internal combustion engine 10 is equal to or lower than a temperature threshold, it is determined that internal combustion engine 10 is in a cold state. In addition, when the cooling water temperature and the lubricant temperature of internal combustion engine 10 are both equal to or lower than the temperature thresholds, it may be determined that internal combustion engine 10 is in a cold state.

When, in, step S9, it is determined that internal combustion engine 10 is in a cold state, the process proceeds to a step S10. When, in step S9, it is determined that internal combustion engine 10 is not in a cold state, the process proceeds to a step S11.

In step S10, it is determined whether or not the NOx adsorption ratio of downstream-side exhaust purification catalyst 33 is equal to or higher than second NOx adsorption ratio threshold A2. When, in step S10, it is determined that the NOx adsorption ratio of downstream-side exhaust purification catalyst 33 is equal to or higher than second NOx adsorption ratio threshold A2, the process proceeds to step S7. When, in step S10, it is determined that the NOx adsorption ratio of downstream-side exhaust purification catalyst 33 is lower than second NOx adsorption ratio threshold A2, the process proceeds to a step S12.

In step S11, it is determined whether or not the operation is in an operation area in which the air-fuel ratio is not made lean. Specifically, for example, in case where an accelerator opening degree becomes full opening so as to operate the internal combustion engine with a high output immediately after starting, it is determined that the operation is in the operation area in which the air-fuel ratio is not made lean. When, in step S11, it is determined that the operation is in the operation area in which the air fuel ratio is not made lean, the process proceeds to step S10. When, in step S11, it is not determined that the operation is in the operation area in which the air-fuel ratio is not made lean, the process proceeds to a step S13.

In step S12, the operation of internal combustion engine 10 is started at the theoretical air-fuel ratio or an air-fuel ratio richer than the theoretical air-fuel ratio. In step S12, in case where, for example, a start time increase amount of fuel is carried out, the air-fuel ratio in internal combustion engine 10 becomes an air-fuel ratio richer than the theoretical air-fuel ratio.

In step S13, the operation of internal combustion engine 10 is started at a lean air-fuel ratio.

As the above, although a specific embodiment of the present invention has been explained, the present invention is not limited to the above embodiment, and various change can be performed without departing from the scope and spirit of the present invention.

For example, although internal combustion engine 10 is a gasoline engine in the above-mentioned embodiment, it may be a diesel engine.

In addition, although, in the above embodiment, internal combustion engine 10 is mounted on a series hybrid vehicle, the present invention is not only applied to a series hybrid vehicle, but also can be applied to a hybrid vehicle including a traveling mode (for example, EV mode) to travel only with the driving force of a drive motor.

For example, in case where the present invention is applied to a parallel hybrid vehicle, since the power threshold is set such that the higher the NOx adsorption ratio of downstream-side exhaust purification catalyst 33 becomes, the larger the power threshold becomes, the traveling mode is easily shifted to the EV mode as the NOx adsorption ratio of downstream-side exhaust purification catalyst 33 becomes higher.

The embodiment mentioned above relates to a method for controlling an internal combustion engine and a device for controlling the internal combustion engine.

The invention claimed is:

1. A method for controlling an internal combustion engine mounted on a hybrid vehicle configured to travel only with a driving force generated by a drive motor, wherein the internal combustion engine is configured to be selectively operated at an air-fuel ratio leaner than a theoretical air-fuel ratio, the method comprising:

determining whether to stop operation of the internal combustion engine in an operation state at the lean air-fuel ratio, based on a NOx adsorption ratio of a NOx purification catalyst provided in an exhaust passage of the internal combustion engine, wherein a determination condition for stopping operation of the internal combustion engine is set to be lower as the NOx adsorption ratio is higher, and wherein the determination condition includes setting a vehicle electric power consumption threshold such that the higher the NOx adsorption ratio is, the higher the vehicle electric power consumption threshold is, and when an electric power consumption of the hybrid vehicle is smaller than the vehicle electric power consumption threshold, the operation of the internal combustion engine is stopped.

2. The method for controlling the internal combustion engine according to claim 1, wherein the vehicle electric power consumption threshold is set according to a vehicle speed of the hybrid vehicle, a SOC of a battery for supplying power to the drive motor, and the NOx adsorption ratio.

3. The method for controlling the internal combustion engine according to claim 1, wherein when the NOx adsorption ratio becomes a predetermined first NOx adsorption ratio threshold or higher, the internal combustion engine is stopped.

4. The method for controlling the internal combustion engine according to claim 1, wherein, at a time of a start of the internal combustion engine, in case where the NOx adsorption ratio is equal to or higher than a predetermined first NOx adsorption ratio threshold, a lean operation in which the air-fuel ratio is set to an air-fuel ratio leaner than the theoretical air-fuel ratio is prohibited.

5. The method for controlling the internal combustion engine according to claim 3, wherein in case where, at a time of a start of the internal combustion engine, the NOx adsorption ratio is equal to or higher than the predetermined first NOx adsorption ratio threshold, the air-fuel ratio is set to an air-fuel ratio richer than at least the theoretical air-fuel ratio to remove NOx absorbed in the NOx purification catalyst, at the time of the start of the internal combustion engine.

6. The method for controlling the internal combustion engine according to claim 4, at the time of the start, when the NOx adsorption ratio is equal to or higher than a predetermined second NOx adsorption ratio threshold smaller than the first NOx adsorption ratio threshold, the air-fuel ratio is set to an air-fuel ratio richer than the theoretical air-fuel ratio, and the internal combustion engine is started, to remove NOx absorbed in the NOx purification catalyst.

7. The method for controlling the internal combustion engine according to claim 2, wherein, the vehicle electric power consumption threshold set in a predetermined threshold variation area in which the vehicle speed is low, the SOC of the battery is high and the NOx adsorption ratio is high is different from the vehicle electric power consumption threshold set in a predetermined normal area in which the vehicle speed is low, the SOC of the battery is high and the NOx adsorption ratio is low.

8. The method for controlling the internal combustion engine according to claim 7, wherein the threshold variation area is an area in which the internal combustion engine is stopped earlier, and, at a time of a start of the internal combustion engine, the air-fuel ratio is set to an air-fuel ratio richer than the theoretical air-fuel ratio to remove NOx absorbed in the NOx purification catalyst so as to improve fuel economy.

9. The method for controlling the internal combustion engine according to claim 7, wherein in case where the electric power consumption of the hybrid vehicle becomes equal to or lower than the vehicle electric power consumption threshold in the threshold variation area, and the internal combustion engine is stopped, the air-fuel ratio is set to an air-fuel ratio richer than the theoretical air-fuel ratio at a time of a start of the internal combustion engine, to remove NOx absorbed in the NOx purification catalyst.

10. A device for controlling an internal combustion engine, comprising:

the internal combustion engine mounted on a hybrid vehicle configured to travel only with a driving force generated by a drive motor, wherein the internal combustion engine is configured to be selectively operated at an air-fuel ratio leaner than a theoretical air-fuel ratio; and a control unit for controlling the internal combustion engine, wherein the control unit is configured to:

determine whether to stop operation of the internal combustion engine in an operation state at the lean air-fuel ratio, based on a NOx adsorption ratio of a NOx purification catalyst provided in an exhaust passage of the internal combustion engine, set a determination condition for stopping operation of the internal combustion engine to be lower as the NOx adsorption ratio is higher, determine a vehicle electric power consumption threshold for stopping operation of the internal combustion engine such that the higher the NOx adsorption ratio is, the higher the vehicle electric power consumption threshold is, and stop the internal combustion engine in response to a determination that an electric power consumption of the hybrid vehicle is smaller than the vehicle electric power consumption threshold.

* * * * *